Feb. 2, 1937.  C. H. MATTHIESSEN, JR  2,069,377
COUPLING DEVICE
Filed April 23, 1935    3 Sheets-Sheet 1

CONRAD H. MATTHIESSEN JR.
INVENTOR

Paul W. Bridgman
ATTORNEY

Feb. 2, 1937.  C. H. MATTHIESSEN, JR  2,069,377
COUPLING DEVICE
Filed April 23, 1935   3 Sheets-Sheet 2

CONRAD H. MATTHIESSEN JR.
INVENTOR

ATTORNEY

Feb. 2, 1937.   C. H. MATTHIESSEN, JR   2,069,377
COUPLING DEVICE
Filed April 23, 1935   3 Sheets-Sheet 3

CONRAD H. MATTHIESSEN JR.
INVENTOR

Paul W. Pruzman
ATTORNEY

Patented Feb. 2, 1937

2,069,377

UNITED STATES PATENT OFFICE 2,069,377

COUPLING DEVICE

Conrad H. Matthiessen, Jr., Pasadena, Calif., assignor to Meyer Coupling Company, Inc.

Application April 23, 1935, Serial No. 17,821

10 Claims. (Cl. 285—168)

An object of my invention is to provide a coupling means adapted to safely convey very high longitudinal stresses, as in lifting or traction.

An object of my invention is to provide a coupling means adapted to connect pipes, hose, and other fluid conducting channels and which is free from the danger of leakage or of separation under high fluid pressures.

An object of my invention is to provide a coupling means in which the two main sections of the coupling may be joined and locked by merely inserting one section into the other; in which the sections so joined cannot be parted by pressure or other stress except by the destruction of the device, and in which the sections may be parted with ease and facility when desired.

The principles of the invention and various modifications of the means by which it is given practical application are illustrated in the accompanying diagrams, in which.

Figure 1:
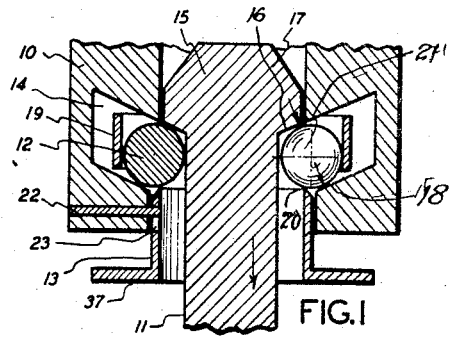
Figs. 1 and 2 are simplified longitudinal sections of the device, showing its essential parts and its general manner of operation.
Figure 6:
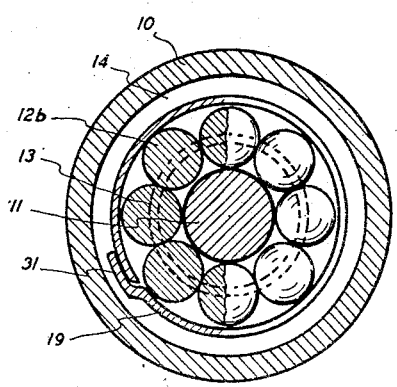
Figure 5:
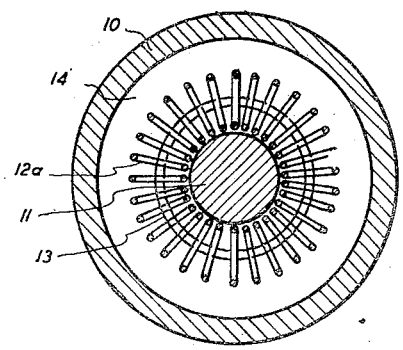
Figure 7:
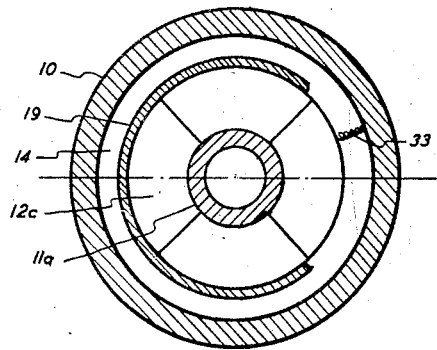
Figure 8:
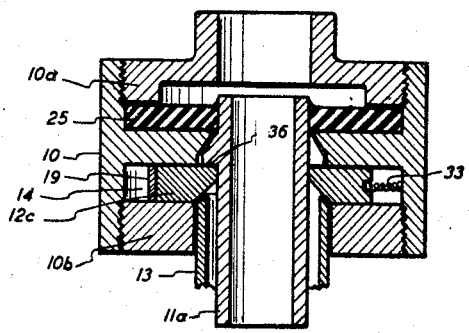
Figure 9:
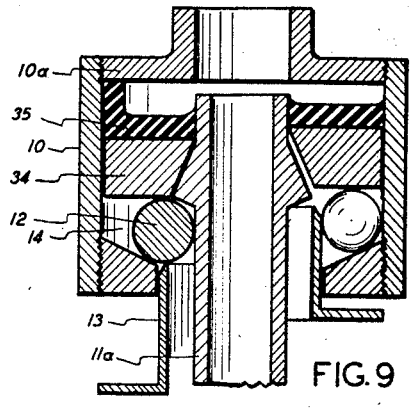
Figure 10:
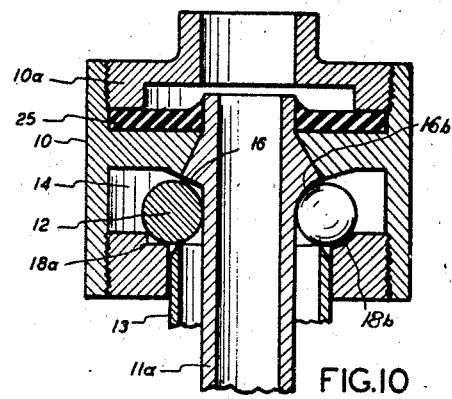
Figure 11:
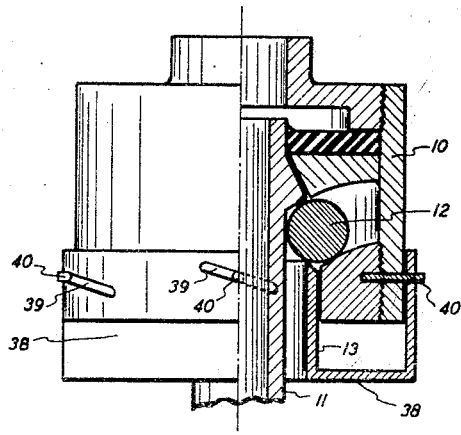
Figure 12:
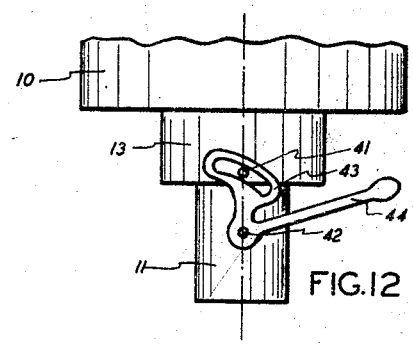
Figure 13:
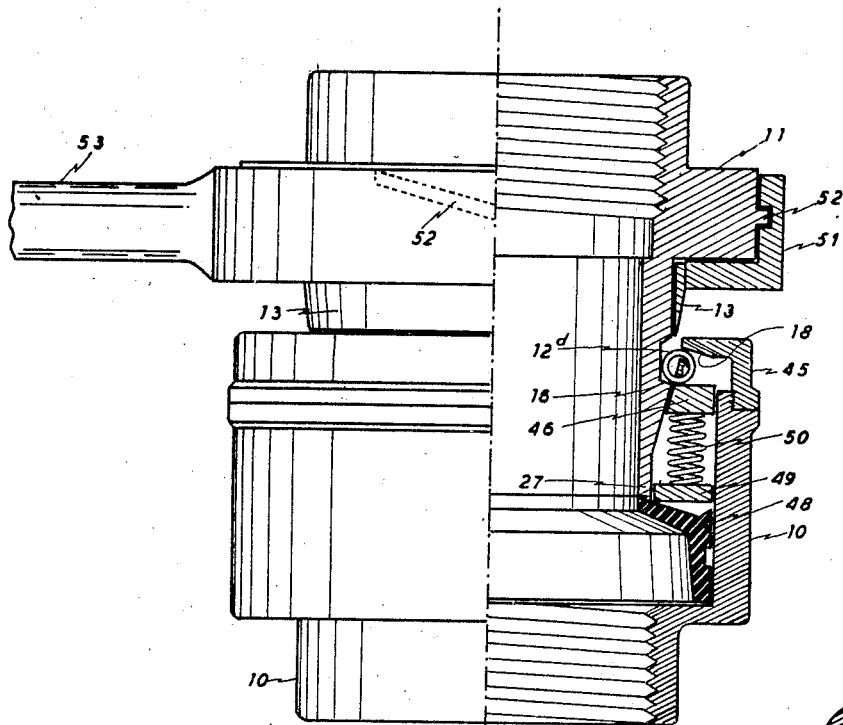
Figure 14:
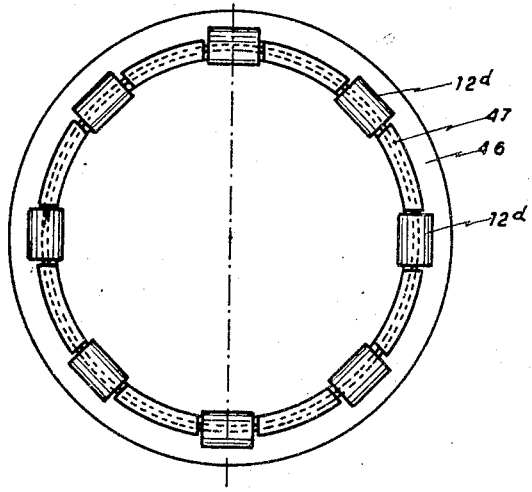

Figs. 5, 6, and 7 are plan views of various alternative forms of the contractile member 12 of Fig. 1;

Figs. 8, 9, and 10 are longitudinal sections showing various forms which may be given the opposed thrust faces 16 and 18 of Fig. 1;

Fig. 11 is an elevation and partial section illustrating a means of actuating the unlocking member 13 of Fig. 1;

Fig. 12 is an elevation illustrating an alternative actuating means;

Fig. 13 is an elevation and partial section of a modified form of the device particularly illustrating a specific provision for end play;

Fig. 14 is a plan view of the element 46 of Fig. 13, and

Figure 15:
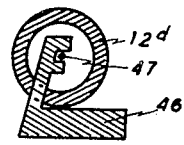

Fig. 15 is a section on an enlarged scale of ring 46 of Fig. 13.

Figure 2:
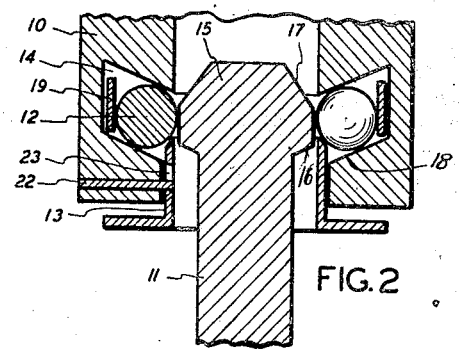

As shown in Figs. 1 and 2, the device has four essential parts, viz: an outer body member 10; an inner body member 11; a contractile bearing or thrust receiving member 12, and an unlocking or counterthrust member 13. Each of these parts may be extensively modified as to form, to adapt the device to various uses or to fit preferred methods of manufacture, but these parts and these respective functions are common to all the modifications herein described and claimed.

The outer body member 10, the upper part of which is broken away in these figures, is provided with an annular channel 14 adapted to receive the contractile member 13 when this member is expanded. The inner body member 11 is provided with an enlarged head 15 which is circumferentially beveled on its lower face 16 and may be tapered at its upper end 17. The lower face of channel 14 is inclined to form a face 18 opposed to face 16. The contractile member may for the present purpose be considered to be a ring of balls as illustrated in Fig. 6, these balls being urged centrally by an enclosing resilient ring 19, suitable means being provided for preventing the balls from falling out when the two body members are separated, as will be explained.

The unlocking member 13 may be tapered at its upper end 20 and the inner edge of this taper is brought inside the center line of the balls composing the ring, as indicated by the positions of the broken lines at 21. Member 13 is free to move in and out of the lower end of outer member 10, the extent of this movement being controlled by a pin 22 riding in a slot 23, or by other means which will be described.

To assemble the device the inner member is inserted from below, the taper 17 forcing the ring of balls into the position shown in Fig. 2 in which the enlarged head may pass between them. When the head reaches the position shown in Fig. 1, the balls are drawn by the spring into the position shown in that figure. If now an effort be made to withdraw the inner member, the longitudinal thrust is transmitted from face 16 through balls 12 to face 18, and such withdrawal cannot be accomplished without either crushing the balls or driving them through one of the opposed faces. With proper design and materials, and within the limitations to the form of opposing forces herein described, this lock may be made to carry very heavy loads without damage.

So long as the longitudinal stress remains, the balls are themselves tightly locked in the position shown in Fig. 1 and the body members cannot spontaneously separate, but the ring may readily be expanded to the position shown in Fig. 2 by moving member 13 upwardly. The inner diameter of this member must be sufficient for head 15 to pass through it. This unlocking movement is resisted by longitudinal stress and the means by which member 13 is actuated must be designed to overcome any expected resistance, which may be entirely removed by removing the stress.

This device may be modified in respect to its adaptation to various uses, the structure of the contractile member, the forms of the opposed faces and of the annular channel, and the manner of actuating the locking member.

Figure 3:
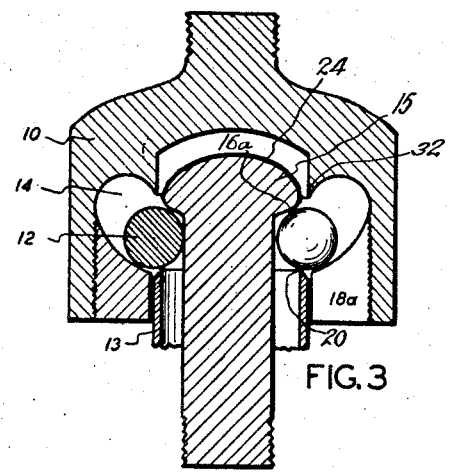
Fig. 3 is a longitudinal section of a modification of the device adapted to lifting and traction.

*Adaptations.*—If the device is to be used for traction (e.g., as an automatic car coupler) or for lifting weights, it may be of the general form illustrated in Fig. 1 or in Fig. 3, the latter showing certain modifications of the shape of head 15 which permit a limited swiveling action.

In this form the head may be curved as at 24 and the opposed thrust faces may be curved as at 16a and 18a to permit a limited rolling movement of the balls while under load.

Figure 4:
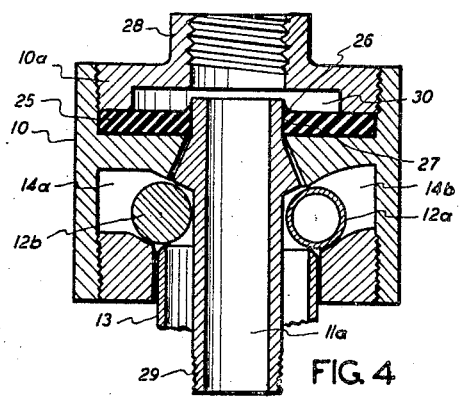
Fig. 4 is a modification of the device adapted to coupling fluid pressure tubes.

If the device is to be used for transmitting fluids under pressure, it may be of the general form illustrated in Fig. 4. For this purpose a fluid tight packing member or gasket must be provided, and while this gasket may take several forms, I prefer that indicated at 25 as a ring of rubber or other compressible material having a lip 26 closely surrounding a straight projection 27 of the upper end of the hollow inner body member 11a. The upper end of the outer body member 10 is in the form of a gasket compression member 10a having a threaded nozzle 28, and the lower end of the inner body member may be threaded as at 29.

This form of the device functions in the manner above described as regards assembling and unlocking. On assembling the projecting end 27 enters the opening in gasket 25 and when fluid under pressure enters the space 30, its pressure is applied to lip 26 to force it firmly against end 27 and form a seal the tightness of which increases with any increase in pressure.

*Contractile member.*—It is required that this member be capable of withstanding a high degree of thrust between the faces 16 and 18, that it be capable of expansion into channel 14 to permit the enlarged head 15 to pass, and that it be adapted to automatically return from the expanded to the contracted position when the expanding force is removed. These requirements are met by several devices, three of which are shown in Figs. 5 to 7 inclusive.

For the smaller sizes in particular, a closed coiled spring of stiff wire, bent into the form of a ring and with its ends joined, as shown at 12a in Figs. 4 and 5, is highly suitable. The ring as formed should have an internal diameter somewhat less than the minor outside diameter of member 11; so that it will always return to its position between faces 16 and 8.

In larger sizes and for high parting stresses (tension or fluid pressure) it may be difficult to provide a spring ring having sufficient rigidity in compression together with sufficient elasticity to allow for ready expansion. In such case a ring of balls may be used, as illustrated at 12b in Figs. 4 and 6, these balls being urged inwardly by a ring of flat spring steel. In Figs. 4 and 6, 12b are the balls and 19 the spring ring, the ends of which should overlap sufficiently, as at 31, to avoid the possibility of a ball passing outside the ring when fully expanded. When this type of contractile member is used, the distance between the upper edge 20 of the unlocking member 13 (see Fig. 3) and the lower edge 32 of the upper face of channel 14 should be less than the diameter of the individual balls to prevent their loss if the unlocking member should be retracted at a time when member 11 is withdrawn from member 10.

For the highest stresses this design may not afford sufficient contact surface, and in such case it is possible to use the split ring of steel or bronze illustrated in Figs. 7, 8, and 9. In these figures the locking segments are indicated at 12c in the contracted position to which they are brought, for example, by the spring ring 19. Any other resilient means, as for example the open coil springs 33, may be used to urge the segments centrally.

*Form of opposed faces and annular channel.*—Referring to Fig. 1, it will be seen that the thrust due to the effort of body member 11 to pass out of member 10 when under load is transmitted from face 16 to the contractile member and through it to face 18. It is evident that these faces should not converge inwardly to any appreciable extent as such arrangement might cause the contractile member to slip and release member 11. The faces may be parallel, but preferably they should converge outwardly, (for example, by about 10°) in which case enough end play should be allowed at some point (as between members 10 and 11 in Fig. 1 or in the compressible rings 25—35 of Figs. 8, 10, and 9) to permit the contractile member to lift face 16 as it passes laterally over face 18.

Another form is that shown in Fig. 9, in which there is a sliding piston 34 made tight against fluid leakage by a rubber or other flexible cup 35. As indicated on the right side of the figure, the piston and cup move upwardly to afford space for the contractile member, while the application of pressure within the body forces the cup and the piston downwardly and firmly locks the contractile member in the closed position. This form of the device is suitable only for use as a fluid conveying coupling.

In place of the straight tapered faces 16 and 18, one or both of these faces may be notched as shown at 18a in Fig. 10, or one or both may be curved to fit the contour of the contractile member as indicated at 16b and 18b of the same figure, this curved seat affording an increased contact surface for the contractile member. Both of these forms require end play between the two body members.

The annular channel 14 is merely a space into which the contractile member may be expanded and its shape is immaterial so long as it offers no obstruction to the free expansion of this member. In Fig. 3 it is shown as a straight projection of faces 16 and 18, but this projection may be broken or curved as indicated at 14a and 14b in Fig. 4.

In the form shown in Fig. 8, in which the segments 12c engage a flat faced shoulder 36, the annular channel is necessarily of the form shown in the figure.

*Actuation of counterthrust member.*—In the figures up to and including Fig. 10 the counterthrust or expanding member 13 is shown as a sleeve 13 tapered externally at its entering end 20 (Fig. 1) and provided with a flange 37. In fittings of small size this flange may be used as a finger hold for forcing the tapered end of the sleeve inside the contractile member to expand it and permit member 11 to be withdrawn.

This simple device is not sufficiently powerful for larger couplings and for these I may use any convenient type of cam, such for example as those shown in Figs. 11 and 12. In Fig. 11 the sleeve 13 is part of a cup 38 fitting around body member 10 and is actuated inwardly or outwardly by revolving the cup, a plurality of inclined slots 39 riding on corresponding pins 40. In Fig. 12 two pins 41 are oppositely fixed in the lower end of unlocking member 13 and two pins 42 in the lower portion of inner body member 11. A pair of cam members 43 are pivoted on pins 42 and are actuated by a hand lever 44 which is connected to both cams, thus moving member 13 upwardly or downwardly in relation to member 11. The figure shows this device in face, only one of the cams being visible.

It will be understood that either of these cam devices may be mounted on either body member as may be convenient, and that any other means may be used to actuate sleeve 13, the means described being illustrative only.

Figs. 13 and 14 show a form of the device which is particularly adapted to the manufacture of large pipe or hose couplings. In this form the outer body member 10 is provided with a screwed ring 45 on which the face 18 is formed. The opposing face 16 is formed on a tubular projection from the inner body member 11. The contractile member is made up of a plurality of small rollers 12d which are made from heavy walled metallic tubing retained on a ring 46 by a wire ring 47 which is of much less diameter than the opening through the rollers.

A cup shaped ring 48 of rubber or other flexible packing is placed in the lower end of outer body member 10 and is of such height as to engage the projecting end 27 of the inner body member. Resting on this packer is a metallic ring 49, and between rings 49 and 46 is placed a resilient member 50 which may be a plurality of open coil springs as shown in Fig. 13, or may be a marcel or other form of thrust spring.

The unlocking member 13 is carried on a cam ring 51 which surrounds the wider part of inner body member 11, the ring and body member being provided with spirally disposed ribs and mating grooves 52 by which the cam ring is forced downwardly and the unlocking member caused to enter and separate the ring of rollers 12d when the handle 53 is revolved.

In this form of the device it is not necessary that there should be end play between the two body members to permit of unlocking, as the movement of the rollers toward the lower end of the fitting (as represented) which is occasioned by their passage over the tapered face 18 is permitted by the resilient member 50. This member should be so proportioned as to be under some slight degree of compression when ring 45 is firmly screwed down on body member 10, as this resilience urges the rollers into their retracted position and makes the locking action positive in any position of the fitting, while the rollers are retained in position and prevented from passing too far toward the center by the wire ring 47. Further, because of the ability of the rollers to move longitudinally as regards both the body members, it is possible to unlock the device while under pressure, a very useful feature in emergencies as, for example, where it is necessary to uncouple fire hose reaching to an elevated position and which cannot be drained.

The device in its various modifications has certain very important advantages over similar devices of the prior art. Of these the chief is its absolute freedom from any danger of spontaneous or accidental separation while in use, together with extreme ease of assembling and unlocking.

As regards the former, the relation of the opposing faces and of the intermediate thrust transmitting member is such that an increase in longitudinal stress, such as may be produced by high internal pressure, does not exercise the slightest tendency to crowd the transmitting member out of its locking position and there is no dependence on frictional resistance to prevent unlocking. Equally an unbalanced stress, such as is produced by pulling a hose at a sharp angle to the fitting to which it is attached, while it throws the strain on one side of the fitting, does not set up any tendency to unlock.

The act of assembling is the mere longitudinal insertion of the inner into the outer body member and is resisted only by the resilience of the thrust member itself (in the form of Fig. 5) or of the retaining springs 19 (of Fig. 2) or 50 (of Fig. 13), plus the resistance of any flexible packing used. The resistance of the spring members is entirely negligible while packing resistance may be avoided by using certain of the forms shown in which the sealing contact is effected by internal pressure after the fitting is assembled. In the form of Fig. 13, for example, a four inch coupling may be connected by hand, using a force materially less than that required to lift the weight of the fitting.

The ease of unlocking is no less, the insertion of member 13 into the expansible member acting in such direction on the balls, spring or rollers that a large fitting under high internal pressure may be opened by the effort which may be exerted with one hand. The necessity for tools to make up or unlock the device is thus entirely avoided.

A further advantage of the device, particularly in the forms using balls as the thrust transmitting member, is that the free end of the fitting may be revolved in the fixed end, even when under high pressures, permitting hose to be twisted in any direction while attached to a hydrant or fire plug.

I claim as my invention:

1. A coupling device comprising: an outer body member having a longitudinal bore and a continuous circumferential channel surrounding said bore; an inner body member adapted to enter said bore and rotatable therein, said inner member having a continuous circumferential shoulder formed thereon, said shoulder and the lower wall of said channel presenting opposing faces so formed as to avoid material inward convergence; a contractile thrust bearing member of ring-like form surrounding said inner body member and normally positioned between said faces to prevent said withdrawal, and a movable sleeve arranged to enter said ring and to expand said bearing member into said channel to permit said withdrawal.

2. A device substantially as and for the purpose set forth in claim 1, in which said contractile member is in the form of a ring of coiled wire.

3. A device substantially as and for the purpose set forth in claim 1, in which said contractile member is in the form of a substantially continuous ring of balls provided with resilient means arranged to urge said balls toward said inner body member.

4. A device substantially as and for the purpose set forth in claim 1, in which said contractile member is in the form of a ring of rollers provided with resilient means arranged to urge said rollers toward said inner body member.

5. A device substantially as and for the purpose set forth in claim 1, in which said contractile member has a circular section and the upward looking face of said channel is arcuately curved to fit said section.

6. A device substantially as and for the purpose set forth in claim 1, in which said contractile member has a circular section and the upward looking face of said channel is circumferentially grooved to afford a plurality of lines of contact with said circular section.

7. A device substantially as and for the purpose set forth in claim 1 in which said opposed faces are approximately perpendicular to the longitudinal axis of said body members when assembled.

8. A tubular coupling device comprising: an outer body member having a longitudinal bore throughout its length and a continuous circumferential channel surrounding said bore; an inner body member of tubular form adapted to enter said bore and rotatable therein, said inner member having a continuous circumferential shoulder formed thereon, said shoulder and the lower wall of said channel presenting opposing faces so formed as to avoid material inward convergence; a contractile thrust bearing member of ring-like form surrounding said inner body member and normally positioned between said faces to prevent said withdrawal, and a movable sleeve arranged to enter said ring and to expand said bearing member into said channel to permit said withdrawal.

9. A device substantially as and for the purpose set forth in claim 8, including fluid packing means interposed between said body members.

10. A device substantially as and for the purpose set forth in claim 8, including a fluid tight, flexible packing ring arranged to grip the end of said inner body member and to be nonleakably retained within said outer body member.

CONRAD H. MATTHIESSEN, Jr.